United States Patent [19]

Letourneur

[11] Patent Number: 5,342,282
[45] Date of Patent: Aug. 30, 1994

[54] CENTRIFUGE INCLUDING A ROTOR DRIVESHAFT WITH AN ELASTIC DAMPING SEAL AND CORRESPONDING SHAFT

[75] Inventor: Jean-Claude Letourneur, Pornichet, France

[73] Assignee: Jouan, Saint Nazaire, France

[21] Appl. No.: 95,228

[22] Filed: Jul. 23, 1993

[30] Foreign Application Priority Data

Aug. 4, 1992 [FR] France .................. 92 09667

[51] Int. Cl.$^5$ ................................ B04B 9/04
[52] U.S. Cl. .............................. 494/82; 494/16; 494/41; 494/83; 494/84; 384/480; 464/180
[58] Field of Search .................. 494/12, 16, 20, 38, 494/41, 46, 82-84; 74/572, 573 R, 574; 68/23.1, 23.3; 277/5; 384/144, 480, 517, 539, 903; 464/65, 89, 112, 114, 137, 138, 178, 180

[56] References Cited

U.S. PATENT DOCUMENTS

| | | | |
|---|---|---|---|
| 847,009 | 3/1907 | Knudsen | 464/180 X |
| 1,482,097 | 1/1924 | Smith | 464/137 |
| 1,814,836 | 7/1931 | Lederman | 464/137 X |
| 2,433,518 | 12/1947 | Ljunggren | 384/517 |
| 2,476,586 | 7/1949 | Darash | 384/539 X |
| 2,827,229 | 3/1958 | Blum | 494/16 |
| 2,913,169 | 11/1959 | Wilsmann | 494/84 X |
| 3,401,436 | 9/1968 | Bradshaw | 384/539 X |
| 3,770,191 | 11/1973 | Blum | 464/89 X |
| 3,779,451 | 12/1973 | Lehman | 494/84 X |
| 3,938,354 | 2/1976 | Lehman | 494/84 X |
| 4,201,066 | 5/1980 | Nolan, Jr. | 494/46 X |
| 4,277,114 | 7/1981 | Lindegger | 384/480 X |
| 4,568,324 | 2/1986 | Williams | 494/82 |
| 5,026,341 | 6/1991 | Giebeler | 74/574 X |

FOREIGN PATENT DOCUMENTS

| | | |
|---|---|---|
| 549253 | 4/1932 | Fed. Rep. of Germany . |
| 622699 | 12/1935 | Fed. Rep. of Germany . |
| 2835962 | 2/1980 | Fed. Rep. of Germany . |
| 467478 | 6/1937 | United Kingdom . |
| 2037939 | 7/1980 | United Kingdom . |

Primary Examiner—Timothy F. Simone
Assistant Examiner—Charles Cooley
Attorney, Agent, or Firm—Pollock, Vande Sande & Priddy

[57] ABSTRACT

A centrifuge comprising a rotor drive shaft including a flexible shaft surrounded by a sheath. The flexible shaft and the sheath are both rotationally secured at a first end. A second end of the flexible shaft extends beyond a second end of the sheath. A head is adapted to receive a rotor of the centrifuge. The head is rotationally secured to the second end of the flexible shaft. A member damps and limits a radial displacement of the flexible shaft with respect to the sheath. The damping and limiting member comprises an annular seal made from an elastic material. The annular seal is axially arranged about the flexible shaft and the sheath at the same level as and close to the head. A skirt is formed on head and surrounds the second end of the sheath. The skirt has an internal annular groove for receiving damping and limiting member. The skirt includes a lower transverse wall limiting the annular groove. The lower transverse wall is pierced with a bore which radially limits an offset of the flexible shaft with respect to the sheath. The damping and limiting member is arranged between the skirt and the sheath. The annular seal has a lip extending axially into the bore and is arranged radially between the skirt and the sheath.

10 Claims, 2 Drawing Sheets

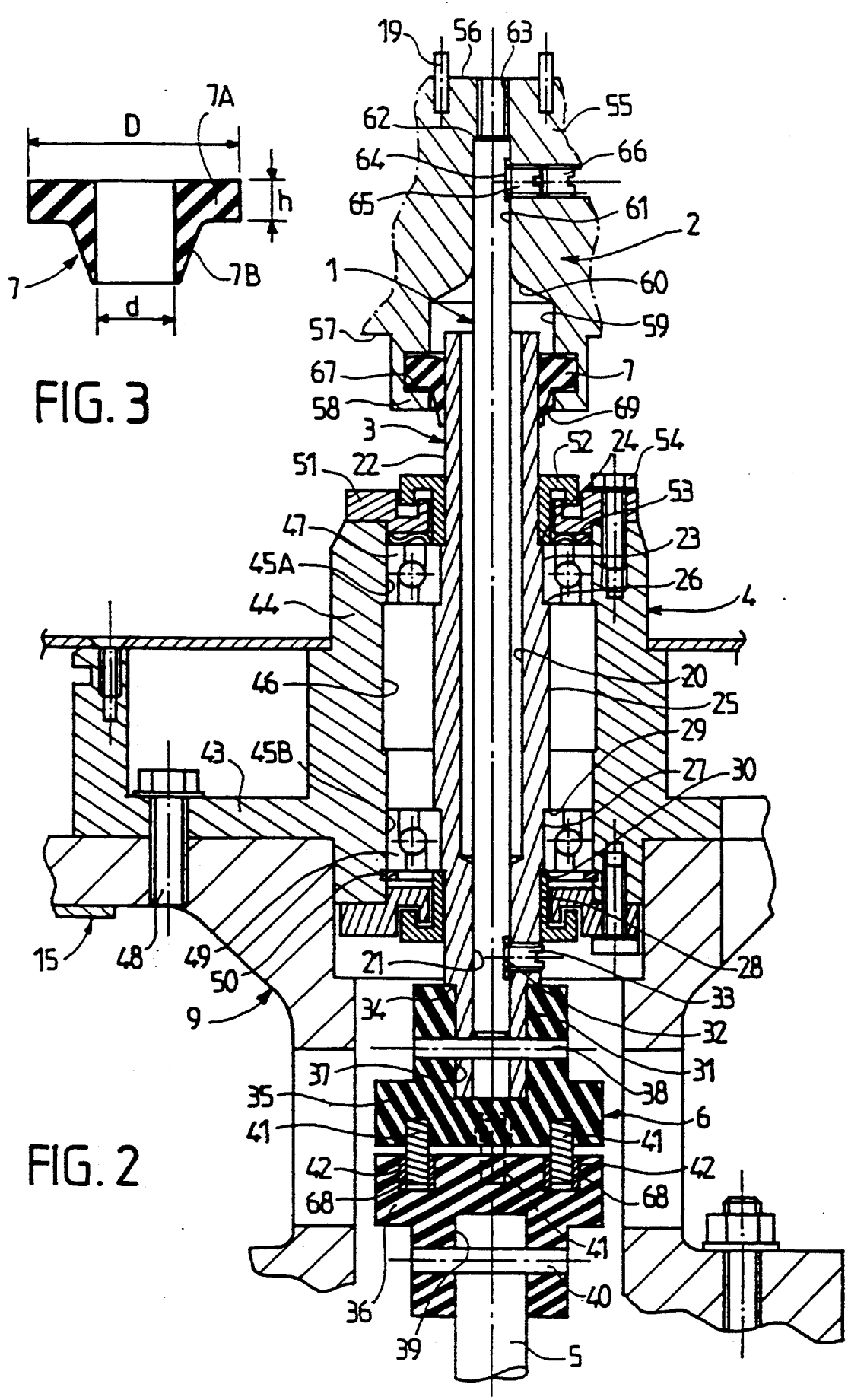

CENTRIFUGE INCLUDING A ROTOR DRIVESHAFT WITH AN ELASTIC DAMPING SEAL AND CORRESPONDING SHAFT

FIELD OF THE INVENTION

The subject of the present invention is a centrifuge including a rotor driveshaft with an elastic damping seal, in particular a centrifuge rotating at very high speed.

BACKGROUND OF THE INVENTION

In general, the rotor of a centrifuge rotating at very high speed is rotationally driven by a flexible shaft surrounded by a sheath. The flexible shaft and the sheath are rotationally mounted in a ball bearing race and joined to a driveshaft, most often the shaft of an electric drive motor, by means of an elastic coupling. As is known, the flexible shaft has the role of limiting the transmission, to the framework of the centrifuge, of the vibrations generated by the rotor and due, for example, to the manufacturing tolerances or to a poor distribution of the load.

It is also known that when the flexible shaft equipped with the rotor is rotating it tends to rotate about its axis of inertia. This axis passes through the center of gravity of the shaft/rotor assembly. More precisely, after a first phase of flexing of the shaft generated by the out-of-balance force of the assembly, the gyroscopic effect generates a righting torque and, as a final result, the axis of rotation passes through the center of gravity of the assembly. This first phase, which is stabilized, is obtained at a speed of rotation of the order of 400 to 1,000 rpm, which, of course, is a function of the shaft, of the rotor, and of the out-of-balance force. This final axis of rotation is radially offset parallel to the geometric assembly axis of the assembly.

It has already been proposed to limit, on the one hand, and on the other hand to damp, this radial offset. This is the case, for example, in the assembly described in U.S. Pat. No. 4,568,324. In this patent, an elastic seal is located between the flexible shaft and the sheath secured to the shaft in order to damp the radial offset. Moreover, the radial offset is limited by a fixed sleeve secured to the framework surrounding the flexible shaft and carrying a ball bearing at an axial distance from the elastic damping seal. The radial offset is limited by the radial clearance existing between the flexible shaft and the internal raceway of the rolling-contact bearing. This assembly exhibits the following drawbacks. On the one hand, when this radial clearance is absorbed, the shaft abuts against the internal raceway of the rolling-contact bearing when the latter is at rest. This gives rise to a rapid deterioration of the shaft. On the other hand, due to the relative arrangement of the rotor, the rolling-contact bearing and the elastic seal, the latter is distant from the rotor, which is the main source of out-of-balance force and vibrations, and damping is not conveniently achieved.

The object of the present invention is to overcome the above described drawbacks.

SUMMARY OF THE INVENTION

The present invention provides a centrifuge including a rotor driveshaft comprising a flexible shaft surrounded by a sheath. The shaft and the sheath are rotationally secured at one of their ends. The other end of the flexible shaft extends beyond the other end of the sheath and carries a head which is adapted to receive the rotor of the centrifuge. Means provided for damping and limiting the radial displacement of the shaft is rotationally secured to the flexible shaft. The damping and limiting means are axially arranged at the same level as and close to the head in order to damp and to limit the radial displacement of the shaft with respect to the rotating sheath.

The head advantageously includes a skirt surrounding the end of the sheath. The damping and limiting means is arranged between the skirt and the sheath. Further, the damping and limiting means comprises an annular seal made from an elastic material. The skirt has an internal annular groove receiving the annular seal. The lower transverse wall of the skirt which limits the annular groove is pierced with a bore which radially limits the offset of the flexible shaft with respect to the sheath. Preferably, the annular seal is mounted in compression between the skirt and the sheath. Advantageously, the annular seal carries a lip extending axially into the bore and arranged radially between the skirt and the sheath. The ends of the shaft and of the sheath which are rotationally secured are received in a housing of one of the two pieces of an elastic coupling. The other piece of the elastic coupling is secured to a motor driveshaft. The sheath is mounted on the chassis of the centrifuge by means of a ball bearing race including a sleeve carrying two ball bearings. The sleeve is closed at each of its ends by a labyrinth seal. One of the rolling-contact bearings axially abuts against a snap ring carried by the sleeve. The other rolling-contact bearing is stressed axially by an axially elastic washer.

By virtue of the invention, the vibrations are damped close to their main source, that is, the rotor carried by the head, and the radial deflection is limited between two pieces, the skirt and the shaft, which rotate at the same speed. The lip of the annular seal prevents metal to metal contact and, in addition, makes the contact progressive.

The subject of the invention is also a centrifuge rotor driveshaft having the characteristics defined hereinabove.

To make the subject of the invention easier to understand there will now be described, by way of purely illustrative and non-limiting example, an embodiment thereof represented in the appended drawings.

BRIEF DESCRIPTION OF THE DRAWINGS

FIG. 2 is a partial sectional view on a larger scale of the centrifuge of FIG. 1, in particular, showing the assembly detail of the driveshaft of the rotor;

FIG. 3 is a sectional view, on a larger scale, of just the elastic seal used for assembling the shaft according to FIG. 2.

DETAILED DESCRIPTION OF THE PREFERRED EMBODIMENTS

Figure 1:
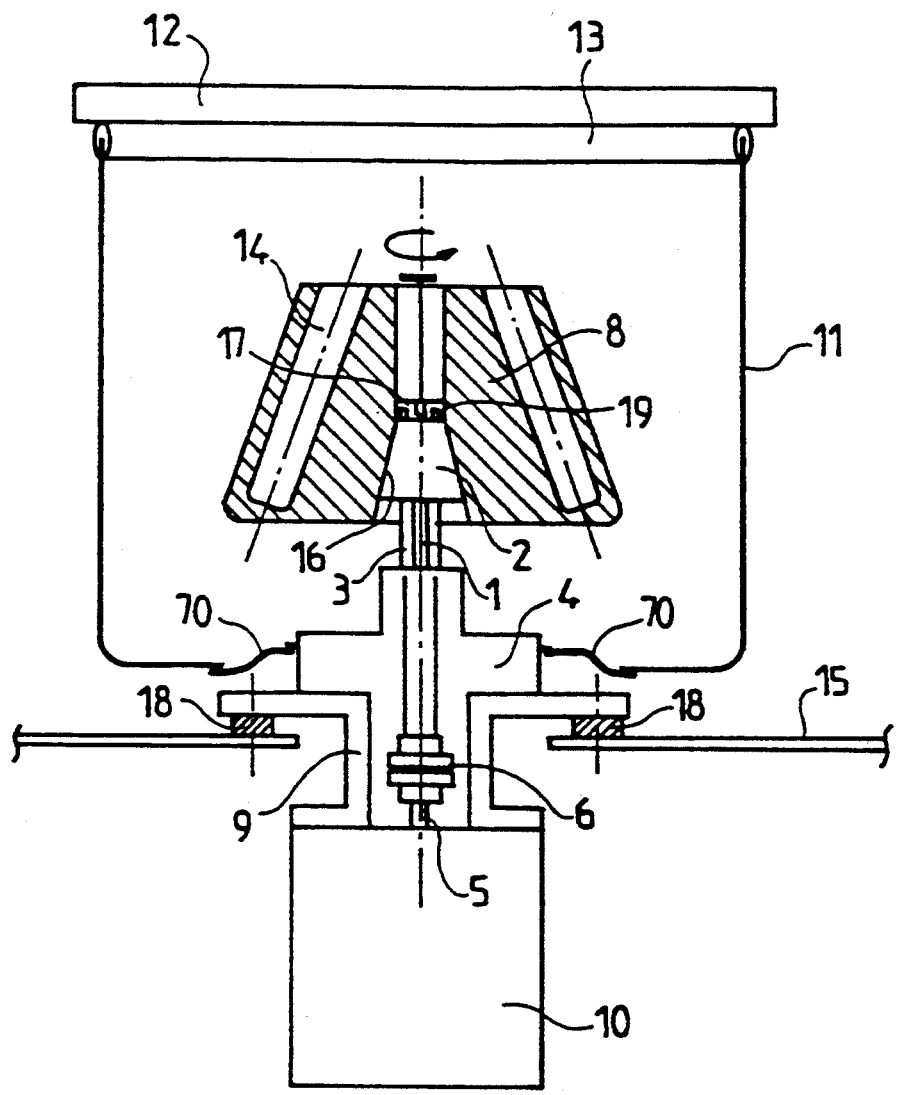
FIG. 1 is an overall general view, partially in section, showing a centrifuge according to the invention.

Referring to FIG. 1, a centrifuge comprises a rotor 8. The rotor 8, represented in frustoconical shape in the figure, may, of course, be of any shape, for example, cylindrical or both cylindrical and frustoconical or some other shape. In FIG. 1, the rotor 8 is provided with cells 14 which are evenly distributed at its periphery and are intended to receive the centrifuging tubes containing the liquid to be centrifuged. The rotor 8 may, instead of the cells 14, carry buckets, particularly buckets provided with fairings for limiting the turbulence.

In order to drive it rotationally, the rotor 8 has, along its axis, a housing 16 opening out at its lower part. The housing 16 is limited at its upper part by a thin section 17 perpendicular to the axis of the rotor 8.

An electric motor 10 is carried by a fixing flange 9, itself fixed to the chassis 15 of the centrifuge by means of elastic blocks 18.

The rotor 8, via its housing 16, is mounted on a head 2 whose shape corresponds to the housing 16. At its upper part, on the transverse face, the head 2 carries axial studs 19 which are housed, when the rotor 8 is mounted on the head 2, in holes provided for this purpose in the thin section 17 of the rotor 8. The rotational drive of the rotor 8 by the head 2 is positively provided by the interaction of the studs 19 with the edges of the holes of the thin section 17. Of course, the axial studs 19 represented may be accompanied or replaced by any other rotational drive means extending axially and/or transversely.

The head 2 is secured to a shaft 1. The shaft 1 is surrounded by a sheath 3. The shaft 1 and the sheath 3 are rotationally mounted with respect to the chassis 15 by means of a ball bearing race 4 secured to the flange 9. At their lower end, the shaft 1 and the sheath 3 are connected to the shaft 5 of the electric motor 10 by an elastic coupling 6. The ball bearing race 4 is connected to a tank 11, secured to the chassis 15, by an elastic ring 70 providing sealing between the two elements. The tank 11 is fitted, at its upper part, with a seal 13 and with a lid 12. As is known, the tank 11 allows a better control of the temperature of the centrifuging tubes in the cells 14. This control is important especially when it involves a centrifuge used for medical applications or in biochemistry. A good number of biological products have to be kept at well specified temperatures, it being possible for these temperatures to vary between 4° C. and 37° C.

With reference to FIG. 2, the rotational assembly of the head 2 on the driveshaft 5 will now be described in more detail. This assembly forms part of the invention.

The sheath 3 is an elongate tubular element of circular cross-section. The sheath has an internal bore 20 opening out at its upper part, and a bore 21 of the same axis but with a diameter less than that of the bore 20 and opening out at its lower part. The bore 21 has an axial length which is less than that of the bore 20. The external surface of circular cross-section of the sheath 3 axially comprises portions of slightly different diameters. From its upper end and towards its lower end, the external cross-section comprises a portion 22 followed by a portion 23 of greater diameter. The portions 22 and 23 thus define a transverse bearing surface 24. The portion 23 is followed by a portion 25 of greater diameter. The portions 23 and 25 thus define a transverse bearing surface 26. The portion 25 is followed by portions 27 and 28 whose diameters are respectively equal to the diameters of the portions 23 and 22. Transverse bearing surfaces 29 and 30 are also defined on the external surface of the sheath. The portion 28 is followed by a portion of smaller diameter which constitutes the lower end 31 of the sheath 3 and defines a transverse bearing surface 34.

The flexible shaft 1 has a diameter which is practically equal to that of the bore 21 of the sheath 3 in which it is mounted. The manufacturing tolerance specified for the bore 21 and the flexible shaft 1 leads to a difference in diameters which must not exceed one hundredth of a millimeter. This adjustment allows excellent concentricity of the shaft 1 and of the sheath 3. The securing of the shaft 1 and of the sheath 3 is obtained by adhesive bonding. For reasons of safety, the lower end of the shaft 1 has a flat 32 on which there bears the end of a set screw 33 which passes through the wall of the sheath 3, in line with the portion 28, into which it is screwed. At their lower ends, the shaft 1 and the sheath 3 end in one same transverse plane. At their upper ends, the shaft 1 extends beyond the sheath 3.

The elastic coupling 6 consists of two identical axisymmetric cylindrical pieces 35, 36. The piece 35 includes a housing 37 receiving the lower end 31 of the sheath 3 and bears on the bearing surface 34. A pin 38 passes transversely through the piece 35 and the sheath 3 in order to secure these two elements together rotationally. In a similar way, the piece 36 includes a housing 39 receiving the end of the driveshaft 5. A pin 40 passes transversely through the piece 36 and the driveshaft 5 in order to secure these two elements together rotationally.

Each one of the pieces 35 and 36 carries two diametrically opposed pegs 41 and two housings 42, with a diameter which is perpendicular to the diameter defined by the pegs 41, receiving a tubular element 68 made of silicon. When the two pieces 35 and 36 are assembled, the two pegs of one are housed in the tubular elements 68 of the other. Thus, the flexible rotational drive is provided by four pegs 41 at ninety degrees.

The bearing race 4 carries a thin section 43 securing it by screws 48 to the flange 9, carried by the chassis 15, and a sleeve 44 in which the assembly formed by the sheath 3 and the shaft 1 swivels. The sleeve 44 internally has two bores 45A, 45B of like diameter opening out to the outside and separated axially by a bore 46 of larger diameter. The bore 45B receives a rolling-contact bearing 49 vertically halted by an elastic snap ring 50 inserted into an annular housing made at the periphery of the bore 45B. The radial width of the snap ring 50 is greater than the radial depth of the annular housing. The sheath 3, slipped into the rolling-contact bearing 49 via its portion 27 rests vertically, via its bearing surface 29, on the internal raceway of the rolling-contact bearing 49.

The bore 45A receives the external raceway of a rolling-contact bearing 47 having an internal raceway slipped onto the portion 23 of the sheath 3 and resting vertically on the bearing surface 26.

Lubricating labyrinth seals close the upper and lower ends of the sleeve 44. At the upper end, the labyrinth seal consists of a metal fixed part 51 and of a rotating part 52 made of plastic. The rotating part 52 is force fitted onto the portion 22 of the sleeve 3 until it comes to bear axially on the bearing surface 24. The rotating part also has an axial return, directed towards the inside of the sleeve 44, partially engaging and pointing into a groove which is open outwards provided in the fixed part 51. The fixed part 51 is fixed onto the transverse plane end face of the sleeve 44 by screws 54. The tightening of the screws is such that the fixed part 51, when it is assembled, compresses an axially elastic washer 53 located axially arranged between the fixed part 51 and the rolling-contact bearing 47. This compression of the washer 53 gives an axial prestress of the bearing 47.

At the lower end of the sleeve 44 there is also arranged a labyrinth seal identical to the seal 51–52, which will therefore not be described. There is no elastic washer between the rolling-contact bearing 49 and the lower labyrinth seal.

At its upper end extending beyond the sheath 3, the flexible shaft 1 carries the head 2 partially represented in FIG. 2. In more detail, the head 2 consists of a piece 55 limited by two parallel faces 56 and 57. The upper face 56 carries the studs 19 for driving the rotor 8. From the lower face 57 there extends, axially downwards, a skirt 58 defining a cylindrical internal housing 59 extending upwards. The internal housing 59 extends inside the piece 55, beyond the transverse plane containing the face 57 of the piece 55. The cylindrical housing 59 is axially followed, upwards, by a tapered section 60 for connecting to a cylindrical bore 61. The bore receives the end of the shaft 1 which comes axially into abutment on a transverse bearing surface 62. The transverse bearing surface 62 separates the bore 61 from a coaxial threaded bore 63 of smaller diameter and opening out to the outside. The bore 61 has a diameter which is practically equal to that of the shaft 1. There again, precise adjustment gives excellent concentricity of the shaft 1 and of the head 2. For reasons of dismantleability, the shaft 1 and the head 2 are not adhesively bonded. In order to drive the head 2 rotationally by means of the shaft 1, the shaft 1 has a flat 64 on which there bears the end of a first set screw 65. The first set screw 65 passes transversely through the wall of the piece 55, in line with the bore 61, into which it is screwed. For safety of the drive, a second set screw 66 is screwed after the first screw 65, and acts as a locking screw.

When the head 2 is mounted on the shaft 1, as described hereinabove, the sheath 3 extends into the bore 69 in line with the skirt 58, practically as far as the transverse plane containing the face 57 of the piece 55. The skirt 58 internally includes an annular groove 67. The skirt 58 is pierced by bore 69 which radially limits the offset of the flexible shaft 1.

An elastic seal 7 is located in the groove 67. The seal 7 is shown, in the free state, in FIG. 3. As can be seen in FIG. 2, the seal is mounted, constrained radially, between the sheath 3 and the head 2 secured to the shaft 1. The seal 7 consists of an axisymmetric circular ring 7A extended downwards by a tapered lip 7B. The compressive stress of the mounted seal 7 depends on the hardness of the material. The lower the hardness is, the greater must be the stress. The stress is, in some way, limited by the installation difficulties. Additionally, the damping of the low-frequency vibrations is correspondingly better when the hardness of the material is low. Good results have been obtained by using neoprene with a Shore hardness equal to 40 to within 10%. The compression has been obtained by inserting a ring 7A of diameter D=28 mm, of height h=4.5 mm, and of diameter at the centre d=15.5 mm between a sheath 3 of external diameter 16 mm and a groove 67 of internal diameter 27.2 mm, over a height of 5.2 mm.

What is claimed is:

1. A centrifuge, comprising:
    a rotor driveshaft comprising a flexible shaft surrounded by a sheath, said flexible shaft and said sheath both being rotationally secured at a first end and being rotatable about an axis, a second end of said flexible shaft extending beyond a second end of said sheath;
    a head adapted to receive a rotor of the centrifuge, said head being rotationally secured to said second end of said flexible shaft;
    means for damping and limiting a radial displacement of said flexible shaft with respect to said sheath, said damping and limiting means comprising an annular seal made from an elastic material, said annular seal being axially arranged about said flexible shaft and said sheath at a same level as and close to said head; and
    a skirt formed on said head and surrounding said second end of said sheath, said skirt having an internal annular groove for receiving said damping and limiting means, said skirt including a lower transverse wall limiting said annular groove, said lower transverse wall being pierced with a bore which radially limits an offset of the flexible shaft with respect to the sheath, said damping and limiting means being arranged between said skirt and said sheath, said annular seal having a lip extending axially with respect to the shaft into said bore and arranged radially between said skirt and said sheath.

2. A centrifuge according to claim 1, wherein said annular seal is mounted in compression between said skirt and said sheath.

3. A centrifuge according to claim 2, further comprising:
    a two piece elastic coupling, said first ends of said shaft and said sheath are received in a housing of a first piece of said elastic coupling;
    a pin passing radially through said shaft, said sheath and said first piece; and
    a motor drive shaft to which the other piece of said coupling is secured.

4. A centrifuge according to claim 2, further comprising:
    a chassis, said sheath being mounted on said chassis by means of a ball bearing race including a sleeve carrying two rolling contact bearings.

5. A centrifuge according to claim 1, further comprising:
    a two piece elastic coupling, said first ends of said shaft and said sheath are received in a housing of a first piece of said elastic coupling;
    a pin passing radially through said shaft, said sheath and said first piece; and
    a motor drive shaft to which the other piece of said coupling is secured.

6. A centrifuge according to claim 5, further comprising:
    a chassis, said sheath being mounted on said chassis by means of a ball bearing race including a sleeve carrying two rolling contact bearings.

7. A centrifuge according to claim 1, further comprising:
    a chassis, said sheath being mounted on said chassis by means of a ball bearing race including a sleeve carrying two rolling contact bearings.

8. A centrifuge according to claim 7, wherein said sleeve is closed at each of its ends by a labyrinth seal.

9. A centrifuge according to claim 7, further comprising:
    a snap ring, said snap ring axially abutting against a first of said rolling-contact bearings, said snap ring being supported by said sleeve; and
    an elastic washer axially disposed in relation to said sheath, said elastic washer stressing the other rolling-contact bearing.

10. A rotor driveshaft for a centrifuge, said rotor driveshaft comprising:

a flexible shaft surrounded by a sheath, said flexible shaft and said sheath both being rotationally secured at a first end and being rotatable about an axis, a second end of said flexible shaft extending beyond a second end of said sheath, said second end of said flexible shaft adapted to receive a head the centrifuge, said head being rotationally secured to said second end of said flexible shaft;

means for damping and limiting a radial displacement of said flexible shaft with respect to said sheath, said damping and limiting means comprising an annular seal made from an elastic material, said annular seal being axially arranged about said flexible shaft and said sheath at a same level as and close to said head, said head including a skirt and surrounding said second end of said sheath, said skirt having an internal annular groove for receiving said damping and limiting means, said skirt including a lower transverse wall limiting said annular groove, said lower transverse wall being pierced with a bore which radially limits an offset of the flexible shaft with respect to the sheath, said damping and limiting means being arranged between said skirt and said sheath, said annular seal having a lip extending axially into said bore and arranged radially between said skirt and said sheath.

* * * * *